United States Patent [19]

Davis

[11] Patent Number: 5,624,377

[45] Date of Patent: Apr. 29, 1997

[54] APPARATUS AND METHOD FOR SIMULATING A HUMAN MASTOID

[75] Inventor: Larry J. Davis, Highland, Utah

[73] Assignee: Larson-Davis, Inc., Provo, Utah

[21] Appl. No.: 389,903

[22] Filed: Feb. 16, 1995

[51] Int. Cl.$^6$ .................................................. H04R 25/00
[52] U.S. Cl. .................................................. 600/25
[58] Field of Search ........................ 600/25; 607/55–57; 181/157, 158, 148, 166, 167–170, 171, 174, 164, 165, 173

[56] References Cited

U.S. PATENT DOCUMENTS

| | | | |
|---|---|---|---|
| 1,698,407 | 1/1929 | Johnson | 181/168 X |
| 1,772,163 | 8/1930 | Squyars | 181/169 |
| 2,910,539 | 10/1959 | Hartsfield | 181/158 X |
| 2,957,954 | 10/1960 | Swinehart | 181/158 X |
| 4,988,333 | 1/1991 | Engebretson et al. | 600/25 |
| 5,218,337 | 6/1993 | Peter | 181/148 |
| 5,425,107 | 6/1995 | Bertagni et al. | 181/170 X |

*Primary Examiner*—Angela D. Sykes
*Assistant Examiner*—Samuel Gilbert
*Attorney, Agent, or Firm*—Thorpe, North & Western

[57] ABSTRACT

An apparatus and method for simulating a human mastoid is disclosed. The apparatus includes a diaphragm having a mass, springiness and damping structure sufficient to more closely replicate the impedance of a human head bone and skin overlying the same, than prior art testing devices. In a preferred embodiment, the method includes placing the diaphragm over the central opening of an artificial ear and placing a bone conduction hearing aid on top of the diaphragm. A microphone disposed below the opening measures the sound generated by the vibration. These measurements provides an indication of whether the bone conduction hearing aid is functioning properly. The apparatus and method are not only easier to use and less expensive than prior art devices and methods, they are also as accurate, if not more accurate.

8 Claims, 7 Drawing Sheets

APPARATUS AND METHOD FOR SIMULATING A HUMAN MASTOID

BACKGROUND OF THE INVENTION

The present invention relates to an apparatus and method for simulating a human mastoid, and, in particular, to an apparatus and method for testing hearing aids and bone conduction testing devices which are of the bone conduction type, so as to ensure that the hearing aid conforms with accepted standards for overcoming the impedance provided by the human mastoid.

Those skilled in the art of hearing aids and related equipment are familiar with the long-felt need to develop a reproducible standard for measuring the ability of a bone conduction hearing device to overcome the impedance of the human mastoid (or other bones in a human skull) and the skin disposed thereon. Additionally, those skilled in the art will recognize that there is also a long-felt need for a device which may be used to ensure compliance with uniform standards which are currently in place.

In many hearing impaired people, portions of the middle ear of been damaged or are otherwise such that simple amplification of the sound is insufficient to enable the person to hear. To overcome this problem, a bone conductive hearing device essentially bypasses the function of the middle ear by propagating vibration to the inner ear via the mastoid or other cranial bone. Thus, the bone conductive hearing device is typically an electromechanical transducer intended to produce the sensation of hearing by vibrating the cranial bones. This is typically done by placing a bone conduction hearing device behind the ear of the user so that a vibrating element of the hearing device rests on the skin which covers the mastoid. Sound waves are converted into vibrational force which is then applied to the skin. The vibrations travel through the skin and the mastoid and are received by the inner ear in a manner similar to that in which the inner ear receives the vibrations of the inner ear in a person with normal hearing.

In order to determine whether bone conductive hearing aids are operating properly, it is necessary to establish a standard of measuring the devices, as well as a testing mechanism for implementing a standard. Additionally, such a standard and mechanism may also be used to test a human mastoid to determine if it functions normally in response to vibratory force. Several approaches have been made in each regard.

In U.S. Pat. No. 3,019,307, a device for measuring reproducible standard for bone conduction receiver measurement is proposed. The standard to which the device is drawn was the result of the National Bureau of Standards and was described in detail in the Journal of the Acoustical Society, November 1955. An electrical equivalent circuit diagram of a machine proposed for testing a hearing device for use on an average mastoid respective to the standard is shown in FIG. 1A. In FIG. 1A, the representation of a bone conduction receiver positioned against a human head includes an inductor, m, which represents the mass of the skin and bone vibrated by the receiver, a resistor, r, which represents the viscous damping due to the skin, and a capacitor, l/k, which represents the compliance or springiness of the skin.

To implement this circuit, a fairly complex, expensive and bulky machine was used. A cross-sectional view of one embodiment of the machine is provided in FIG. 1B. A bone conduction vibrator (14) is placed on a magnesium disk (10) which is supported by one or more arms (16). When the bone conduction vibrator is turned on, force is transferred through a piston block (22) and measured by an accelerometer (50). Damping of the disk (10) so as to simulate the skin, is provided by an air space (32) between the disk and the piston (30).

Additional research was performed and mechanical impedance values for an idealized average cranial bone (either mastoid or other) were created by the International Organization for Standardization prior to 1970, and were incorporated into the ANSI S3.13-1972 (R-1977), American National Standard for an Artificial Headbone for the Calibration of Audiometer Bone Vibrators and into IEC Publication 373 (1971). An approximate equivalent circuit for the artificial idealized headbone is shown in FIG. 1C, wherein m is a mass of $0.77 \times 10^{-3}$ kg, r is 19.3 $Nsm^{-1}$, and k is $2.25 \times 10^5$ $Nm^{-1}$. The goal of the equivalent circuit was to provide a testing device which could replicate the impedance of an average headbone as shown in Table I.

TABLE I

| Frequency (Hz) | Mechanical reactance N s m⁻¹ | Mechanical resistance N s m⁻¹ | Mechanical impedance N s m⁻¹ |
|---|---|---|---|
| 125 | −290.0 | 74 | 299 |
| 160 | −220.0 | 55 | 227 |
| 200 | −180.0 | 44 | 185 |
| 250 | −140.0 | 36 | 145 |
| 315 | −110.0 | 29 | 114 |
| 400 | −89.0 | 25 | 92 |
| 500 | −71.0 | 22 | 74 |
| 630 | −55.0 | 20 | 59 |
| 800 | −42.0 | 19 | 46 |
| 1000 | −32.0 | 18 | 37 |
| 1250 | −23.0 | 17 | 29 |
| 1500 | −17.0 | 17 | 24 |
| 1600 | −15.0 | 17 | 23 |
| 2000 | −8.4 | 17 | 19 |
| 2500 | −2.2 | 18 | 18 |
| 3000 | +2.7 | 18 | 18 |
| 3150 | +3.9 | 18 | 18 |
| 4000 | +10.0 | 19 | 21 |
| 5000 | +17.0 | 21 | 27 |
| 6000 | +22.0 | 23 | 32 |

In ANSI S3.13-1987, 8 kHz was added as a test frequency.

In ANSI S3.26-1981, however, it was noted that no commercial product had become available that matches the impedance values within close tolerances, and that some of the devices attempting to match the values were inconsistent. Because no testing apparatus was available that met the standard, an appendix to ANSI S3.26-1981 set forth a type 4930 artificial mastoid as being the testing apparatus of choice, apparently because it was the most accurate device available. A partial cross-sectional view is shown in FIG. 1D. The device includes a loading mass (60) which is sandwiched between a butyl rubber cover (62), and a neoprene disk (64). The two rest on a domed based (66) which is in turn positioned above guide pins (68), ceramic disks (70) and a central electrode (72) which is connected to an output (74). An inertial mass (76) is also provided.

Those skilled in the art will be familiar with the device. The device is relatively expensive and is difficult to calibrate. In order to ensure an accurate result, numerous springs must be adjusted. Because of these factors, many hearing specialists do not purchase a device for conducting tests on bone conduction hearing devices. Rather, they simply purchase an artificial ear, a device for calibrating earphones used in hearing tests.

A side cross-sectional view of an artificial ear is shown in FIG. 1E. The artificial ear is made to internationally accepted specifications, and includes a generally cylindrical housing (80) with an opening (82) at one end. A small vent hole (84) is provided in the housing, along with a hole (86) for receiving the chord of a precision microphone (88). The volume of a void (90) between the opening (82) and the microphone (88) is six cubic centimeters, the average volume of air in a human ear.

Because of the wide spread availability of the artificial ear, and the fact that it is considerably less expensive than the artificial mastoids, it would be beneficial to find an apparatus and method which would allow an artificial ear to be used to test bone conduction hearing devices. Additionally, it would be beneficial if the apparatus and method was as accurate, or more accurate in representing the impedance of a human mastoid than the devices of the prior art.

OBJECTS AND SUMMARY OF THE INVENTION

It is an object of the present invention to provide an apparatus and method for testing bone conduction hearing devices.

It is another object of the present invention to provide such an apparatus and method which is less expensive than currently available testing devices.

It is yet another object of the present invention to provide such an apparatus and method which is are more accurate than the testing devices which are presently available.

It is still another object of the present invention to provide such an apparatus and method which are easier to use than the testing devices which are presently available.

The above and other objects of the invention are realized in specific illustrated embodiments of an apparatus and method for simulating a human mastoid. The apparatus for simulating a human mastoid includes diaphragm having a mechanical impedance representative of an average human mastoid, as shown in Table I. The diaphragm has a central section and a peripheral flange extending from the central section which are configured in shape and composition to supply a desired reactance and resistance to vibratory force, such as the force which is generated by a bone conduction transducer, based on mass and stiffness of the diaphragm, thereby simulating impedance of a human mastoid bone.

In a preferred embodiment, the method includes placing the diaphragm over the opening in an artificial ear, and placing the bone conduction transducer on the opposite side of the diaphragm. A weight of 5.4N is placed against the bone conduction transducer to simulate a bone conduction hearing device in actual use. The bone conduction transducer is tested through select frequencies, as shown in Table I, to test the transducer. Readings obtained by the microphone in the artificial ear gives more accurate readings than had been available prior to the present invention, and does so by making use of the artificial ear, a device owned by nearly all audiologists.

In accordance with another aspect of the invention, the impedance of the simulated mastoid may be monitored in other ways, such as by the use of a laser and/or a position sensor, to determine the effectiveness of the bone conduction transducer.

In accordance with another aspect of the invention, a device other than an artificial ear may be used with the diaphragm to determine the effectiveness of a bone conduction transducer.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 2:
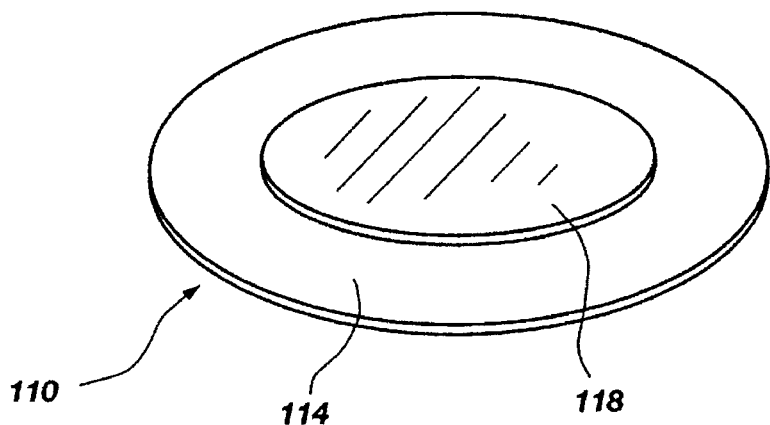
FIG. 2 shows a perspective view of a diaphragm made in accordance with the principles of the present invention.

Reference will now be made to the drawings in which the various elements of the present invention will be given numeral designations and in which the invention will be discussed so as to enable one skilled in the art to make and use the invention. Referring to FIG. 2, there is shown a diaphragm, generally indicated at 110. The diaphragm 110 consists of a stiffening plate 114, and a damping layer 118 which is preferably adhesively attached the stiffening plate.

Figure 5:
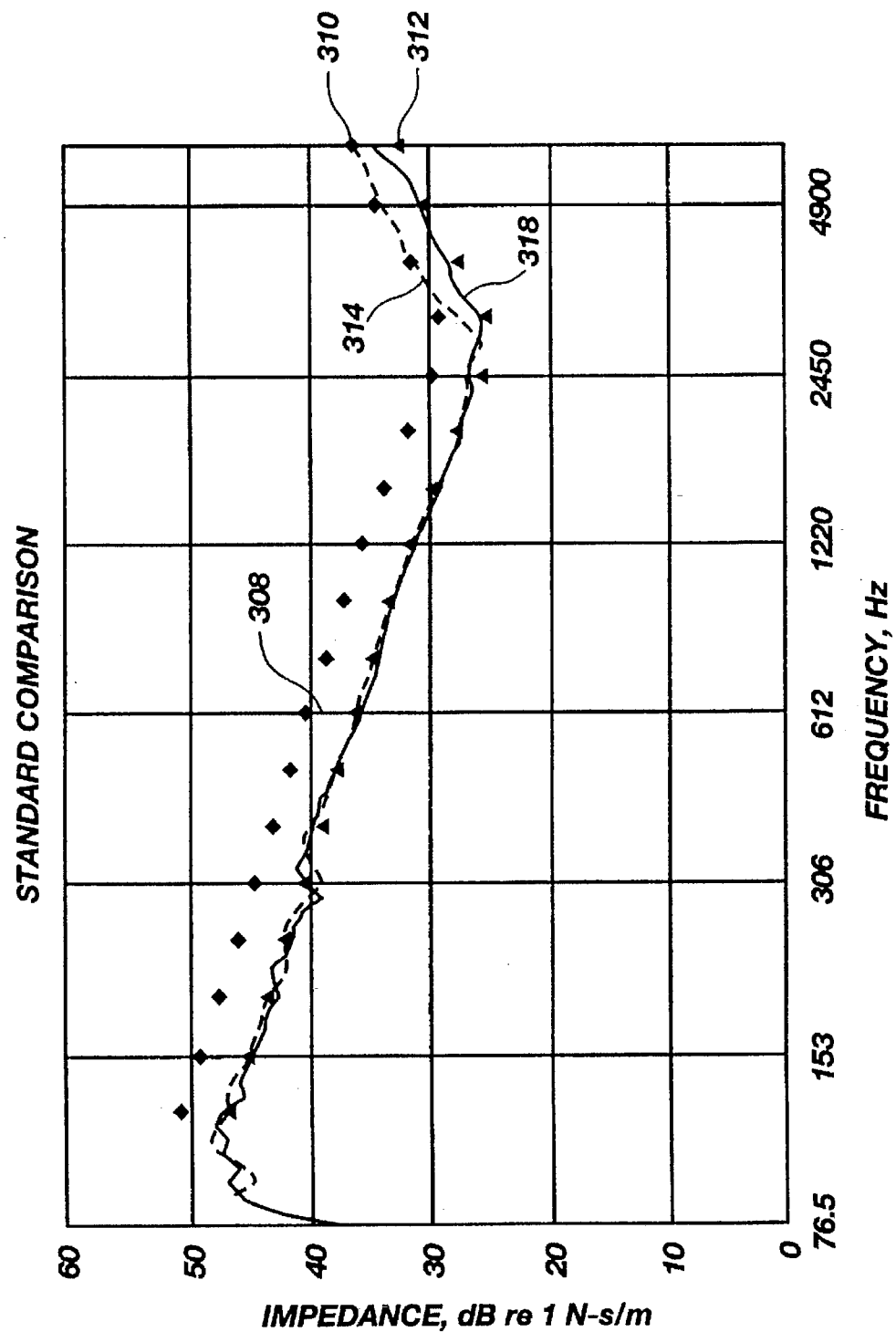
FIG. 5 shows an graph demonstrating an ideal response for an artificial mastoid in accordance with the American National Standard, as well as actual responses from the prior art device shown in FIG. 1D and the embodiment of the present invention shown in FIG. 4.

In order to properly simulate a human mastoid and the skin which overlies the mastoid, the test device must include springiness, damping and mass in interrelation to achieve impedance (reactance and resistance) which corresponds to that present in the average human as shown in Table I. The substance the test device is made from is not of major importance. Rather, what is important is that the device have impedance properties which conform the standards determined by scientific study. Namely, the mass, springiness and damping must integrate to provide an impedance (reactance and resistance) similar to the average mastoid. A graph providing an ideal response range and those provided by one embodiment of the present invention and the prior art are shown in FIG. 5, and will be discussed in additional detail below.

Prior attempts to simulate the human mastoid have included complex structures working against other structures, rather than a simple second order system. In contrast, the simulated mastoid of the present invention, comprises a simple, second order system, i.e. the diaphragm 110

Typically, the stiffening plate 114 of the diaphragm will be made of metal, such as aluminum, and the damping layer will be made of a synthetic rubber-like material having a known density, such as neoprene. However, in light of the present disclosure, those skilled in the art will recognize that the material of the diaphragm is not important, as long as the stiffening plate 114 and the damping layer 118 have the proper springiness, mass, and damping characteristics. As will be discussed below, the stiffening plate 114 and the damping layer 118 could even be formed of a single material, such as a composite.

In the embodiment shown in FIG. 2, the stiffening plate 114 is an aluminum disk having a mass of between about 0.5 and 1 gram, and preferably about 0.77 grams. The shape of the stiffening plate is not important, so long as the components of impedance are met. Suitable materials from which the stiffening plate may be made include, for example, magnesium, graphite composite, plastic, beryllium, stainless steel, monel and aluminum.

Likewise, the damping layer has a mass of 0.1 gram to 3 grams, and is generally disk shaped, but could be other shapes as well. Materials from which the damping layer may be made include, but are not limited to neoprene rubber, butyl rubber, polyurethane, vinyl, and other visco-elastic polymers (either foamed or not foamed).

Typically, the stiffening plate 114 has a diameter of between about 1.5 and 3 inches, and a thickness of between about 0.05 and 0.3 inches. The damping layer 118 has a smaller diameter, typically, less than 1 inch. Obviously, the diaphragm need not be of uniform thickness as long as its springiness, mass and damping are in appropriate relationship to one another to achieve an impedance similar to that specified in the accepted standards. In fact, as will be discussed with respect to FIG. 4, in a preferred embodiment, the stiffening plate is not of a uniform thickness.

Figure 3:
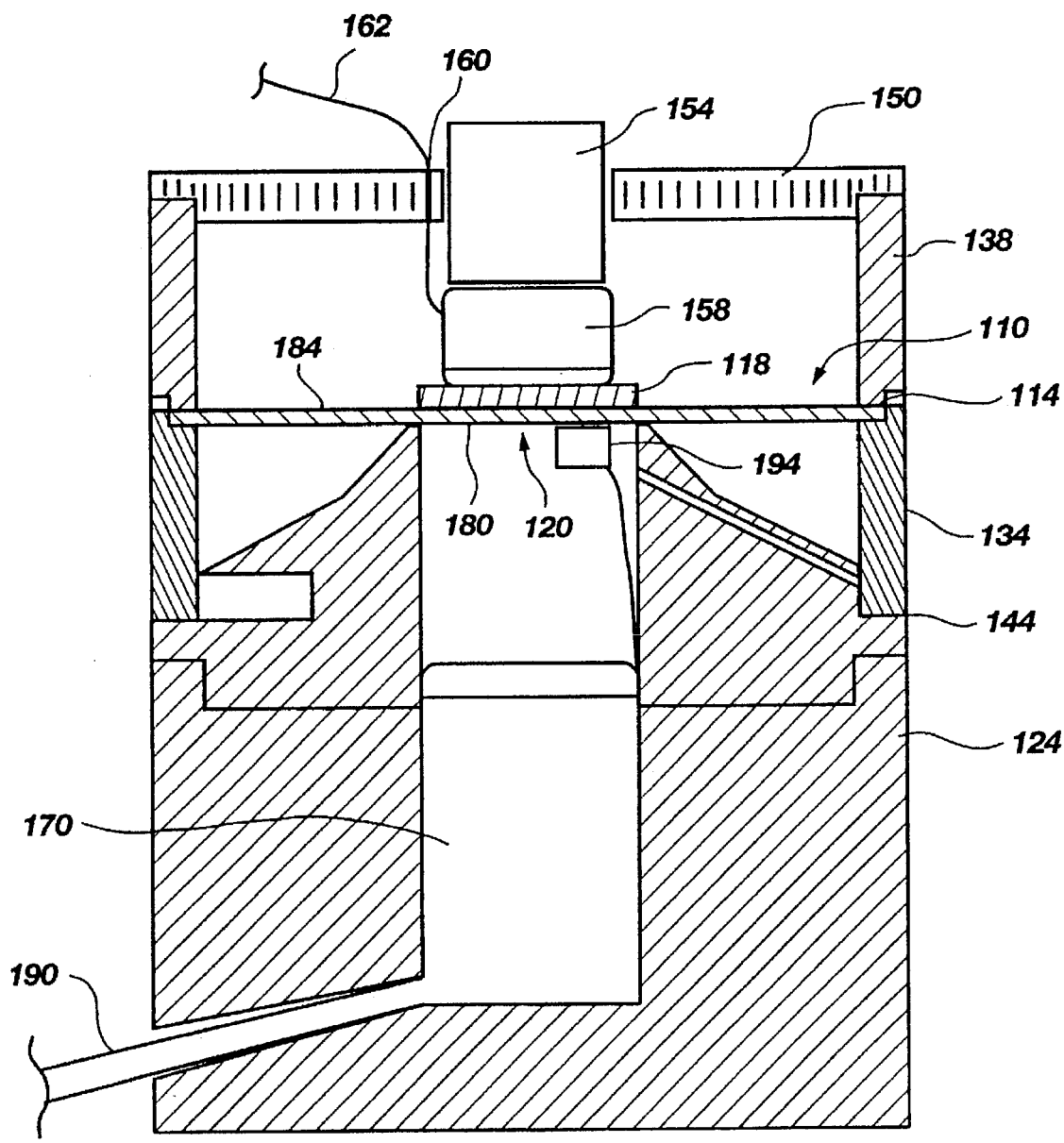
FIG. 3 shows a side cross-sectional view of the diaphragm of FIG. 2 disposed on a conventional artificial ear, as shown in FIG. 1E, and a plurality of support members for holding the diaphragm in place adjacent the artificial ear.

Referring now to FIG. 3, there is shown a cross-sectional view of a diaphragm disposed on a conventional artificial ear, and a plurality of support members for holding the diaphragm in place adjacent the artificial ear. Specifically, the diaphragm 110 is positioned so that the stiffening plate 114 rests on an opening 120 in the artificial ear 124.

As shown in FIG. 3, the stiffening plate 114 is supported by a pair of holding rings 134 and 138. The lower ring 134 nests on the annular ridge 144 of the artificial ear 124 and rests against the bottom of the stiffening plate 114. An upper ring 138 extends upwardly from the stiffening plate 114 and supports a weight restraining plate 150. As the name implies, the weight restraining plate 150 has a hole formed therein for holding a weight 154. In accordance with accepted standards, the weight 154 is typically a 5.4N weight which rests atop a bone conduction transducer 158 and holds it in firm contact with the damping layer 118 of the diaphragm 110. The weight restraining plate 150 may also have a small wire cut 160 to facilitate placement of a power cord 162 for the bone conduction transducer 158.

In use, the bone conduction transducer 158 is activated to vibrate in a conventional fashion. The vibrations generated by the bone conduction transducer 158 are conveyed through the diaphragm 110 and result in sound being conveyed to a microphone 170 positioned in the artificial ear 124. As the vibrations pass through the mass of the diaphragm 110, the damping layer 118 damps the vibrations, and the springiness component of impedance is obtained by the hinge like interaction between a central section 180 of the stiffening plate 114, and an peripheral outer section 184 of the stiffening plate. In light of this disclosure, and other information generally know, those skilled in the art will appreciate that this interaction depends on the mass of the central section 180, the thickness of the peripheral outer section 184, as well as the stiffness of the material from which the stiffening plate 114 is made.

The sounds received by the microphone 170 are converted into an electrical impulse and sent via a cable 190 to a recording instrument. By measuring the sound, i.e. the displacement of the central section 180, the microphone 170 indicates the effectiveness of the bone conduction transducer 158. The arrangement shown is not only at least as accurate as the testing devices of the prior art, it is also much easier to use, and is considerably less expensive. Most audiologists own an artificial ear 124, and the cost of a new one is about one-quarter that of the prior art testing devices. Within a matter of seconds, the artificial ear 124 can be converted into an artificial mastoid and can be used to nest bone conduction hearing devices.

While the microphone 170 is the preferred method for measuring the vibrations which pass through the impedance provided by the diaphragm 110, an accelerometer 194 could also be used to determine vibratory force. In fact, any method of measurement which is able to determine the vibrations of the diaphragm 110 may be used to determine whether the bone conduction transducer 158 is functioning properly.

Thus, with the embodiment shown in FIG. 3, an accurate result is obtained concerning the bone conduction transducer 158. Additionally, because of the ease of the testing method and the decreased cost, more audiologists will be able to test bone conduction hearing devices for their patients.

Figure 4:
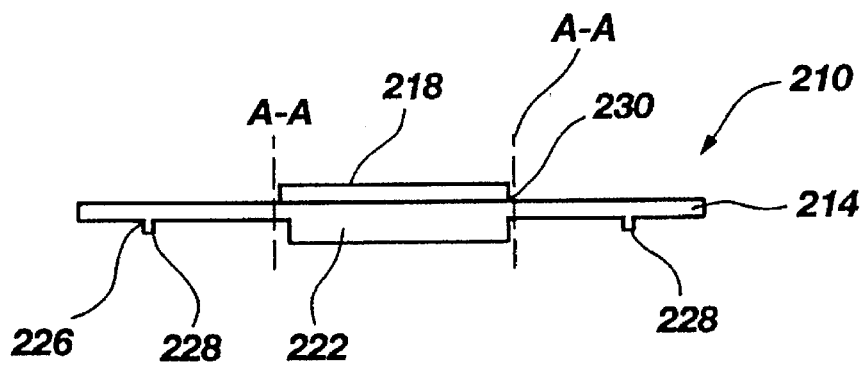
FIG. 4 shows a side cross-sectional view of another diaphragm representing a preferred embodiment made in accordance with the principles of the present invention.

Referring now to FIG. 4, there is shown a side cross-sectional view of another embodiment of a diaphragm made in accordance with the principles of the present invention, and which is believed to be the preferred embodiment of the invention. Specifically, the diaphragm, generally indicated at 210, includes a stiffening plate 214 and a damping layer 218. The stiffening plate 214 is made of aluminum and has a mass of slightly more than 0.8 grams. As may be observed from FIG. 4, the majority of the mass (approximately 0.77 grams) is disposed in a central section 222, which is about 1.3 inches in diameter and about 0.06 inches thick. A thin peripheral flange 226 extends radially outwardly from the central section 222 for about 0.45 inches. The peripheral flange section 226 is about 0.02 inches thick. An annular flange 228 about 0.02 inches thick may extend downwardly from the peripheral flange 226 about 0.28 inches from the central section 222. While the portions of the peripheral flange 226 may of the same thickness on both sides of the annular flange 228, they may also be thinner inside of the annular lange, i.e. 0.01 inches, or thicker, i.e. 0.03–0.05. As will be appreciated in light of the present disclosure, changing the thickness will alter the springiness provided by the peripheral flange 226.

The damping layer 218 is attached to the stiffening plate 214 by an adhesive material 230 and is made of a synthetic rubber-like material, such as silicone rubber, having a consistent and known density. Typically, the damping layer will be about 0.05 inches thick and about 1 inch in diameter.

When using the embodiment shown in FIG. 4, the diaphragm 210 is set upon an artificial ear (shown in FIG. 3) so that the central section 222 nests within the opening 120 (FIG. 3) and so that the peripheral flange 226 rests on the end of artificial ear forming the opening. In order to properly simulate the impedance of a human mastoid and the skin covering the mastoid, a testing device must provide damping, springiness and mass representative of the human mastoid. When a bone conduction transducer is applied to the damping layer, damping is provided by the damping layer 218. Springiness is provided by a the peripheral flange 226 and its interaction between the central section 222. Specifically, the peripheral flange and the radially extending peripheral flange 226 forms a concentric hinge about the central section 226 along the lines A—A. The mass necessary is provided by the diaphragm 210, and, in particular, the central section 222.

Those skilled in the art will recognize that the defined mass, dimensions, etc., are appropriate for a diaphragm made from the specified materials. If other materials are used, or if any of the dimensions are changed, adjustments must be made to compensate for differing densities, as well as differences in springiness and damping ability. Those skilled in the art will be able to determine the exact dimensions for other materials which may be used without excessive experimentation by comparing impedance results obtained to the idealized curve, shown in FIG. 5, representing the ideal simulated mastoid.

One major advantage of the embodiment shown in FIG. 4 is that the increased thickness of the central section 222 causes that section to nest in the opening of the artificial ear (FIG. 3). Because the central section 222 nests within the opening, lateral movement of the diaphragm 210 is significantly reduced, and there is no need for the support rings 134 and 138, and the weight restraining plate 150 shown in FIG. 3. Rather, a bone conduction transducer (FIG. 3) may be placed on the damping layer 218, and a 5.4N weight placed on top of the transducer. The diaphragm's lateral movement is not generally significant enough to cause the transducer or the weight to fall over if properly placed on the artificial ear.

Figure 1A:
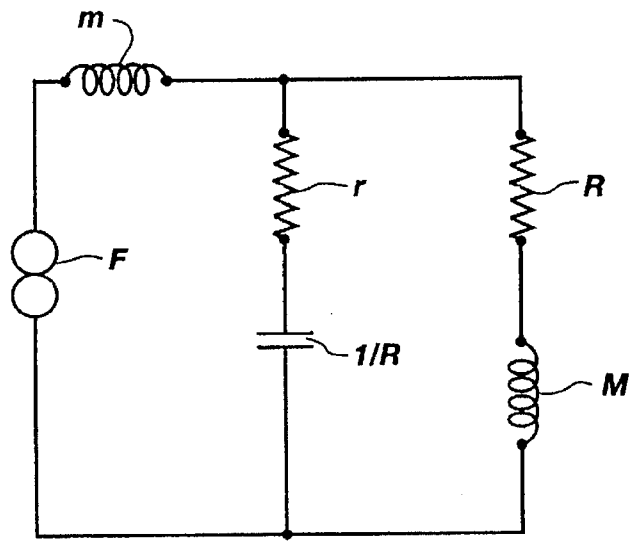
FIG. 1A shows an electrical equivalent circuit diagram of an apparatus for testing a bone conduction hearing device in accordance with the teachings of the prior art.
Figure 1B:
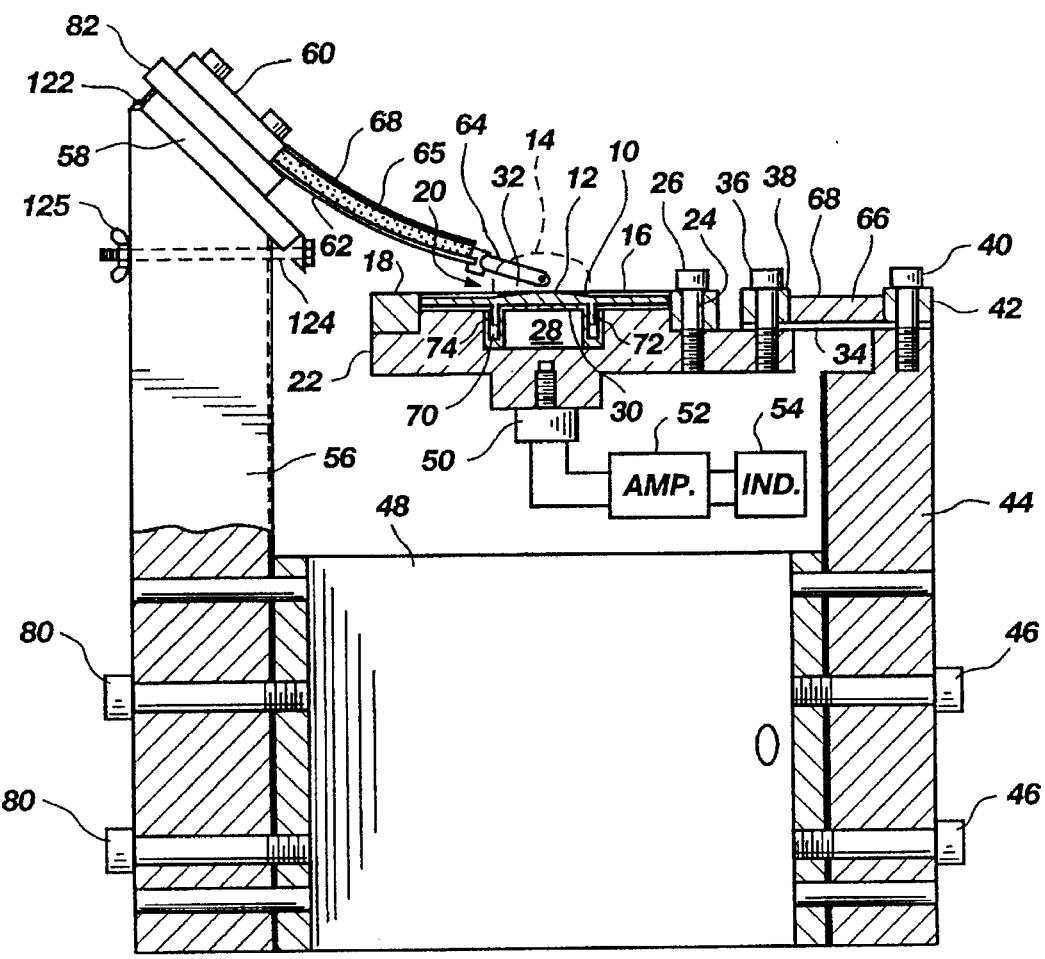
FIG. 1B shows a side cross-sectional view of a prior art device for testing bone conduction hearing devices.
Figure 1C:
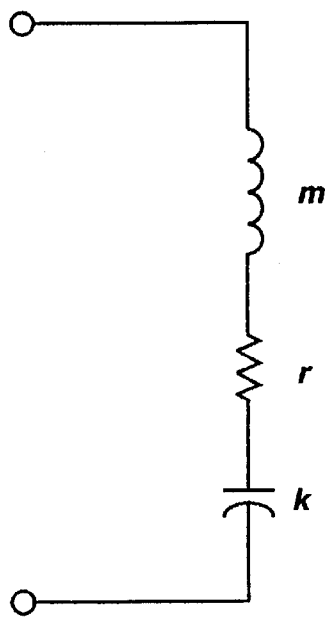
FIG. 1C shows an approximate equivalent circuit for the American National Standard for an artificial headbone for calibrating bone conduction hearing devices.
Figure 1D:
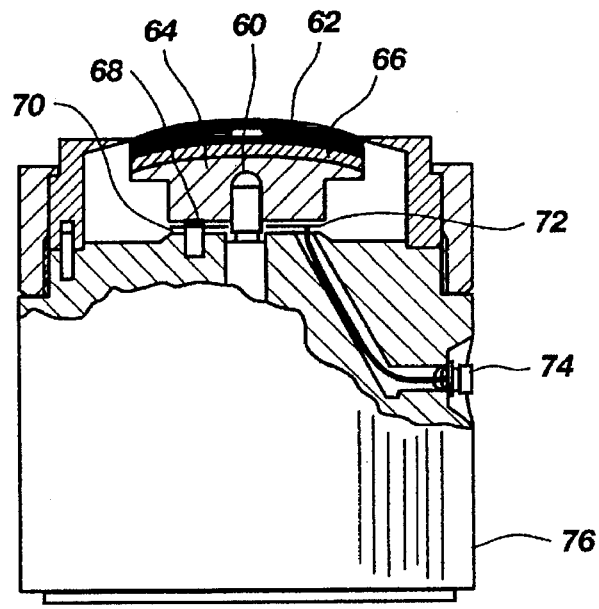
FIG. 1D shows a side, partial cross-sectional view of another prior art device for testing bone conduction hearing devices.

Referring now to FIG. 5, there is shown a graph representing the ideal curve range 308 representing the standard discussed above, the upper end of the range being shown at 310 and the lower end of the range at 312. A curve representing a test response of the prior art device shown in FIG. 1D is shown at 314. Also shown is a curve 318 representing the readings obtained during a test of the embodiment discussed in FIG. 4. As can be seen, the embodiment discussed in FIG. 4 provides an equally accurate representation of the ideal curve 310, and therefore, an equally accurate representation of an average human mastoid. Thus, when used to test bone conduction hearing devices, the present invention provides increased convenience and similar accuracy, while drastically reducing the cost.

While the embodiment shown in FIG. 4 is equally accurate to the prior art device shown in FIG. 1D under generally ideal conditions, it becomes significantly more accurate as temperatures change. The readings shown in FIG. 5 are for tests conducted at about 23° C. However, as one moves away from that temperature in either direction, the accuracy of the prior art devices decrease significantly. In contrast, the diaphragm of the present invention maintains a similar curve. Those skilled in the art will understand that such differences are significant, as the prior art devices can take hours to equalize to the temperature of a room. This is especially important in that many laboratories contract with a testing services which travel between laboratories and cannot wait hours for the testing equipment to equalize to the desired temperature.

In contrast, the diaphragm of the present invention can equalize to room temperature within a matter of minutes, and may even be used accurately at temperatures significantly above and below the temperature stated above.

Figure 6:
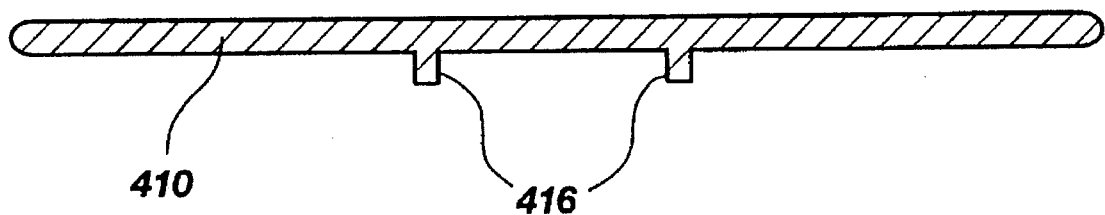
FIG. 6 shows yet another cross-sectional view of a diaphragm made in accordance with the principles of the present invention.

Referring now to FIG. 6, there is shown another embodiment of the present invention. Rather than providing a diaphragm, as in FIGS. 2 and 4, which has a synthetic damping layer and a metallic stiffening plate, the present embodiment is a diaphragm comprising a single composite disk 410. The disk 410 is formed so that it incorporates the springiness, damping and mass necessary to replicate the impedance of a human mastoid. Obviously, the exact dimensions of the disk will be dependant on the type of composite used, whether that material is graphite or some other composite. Additionally, the significant growth in development of new composites will likely provide several which are suitable for a diaphragm as described herein.

Figure 1E:
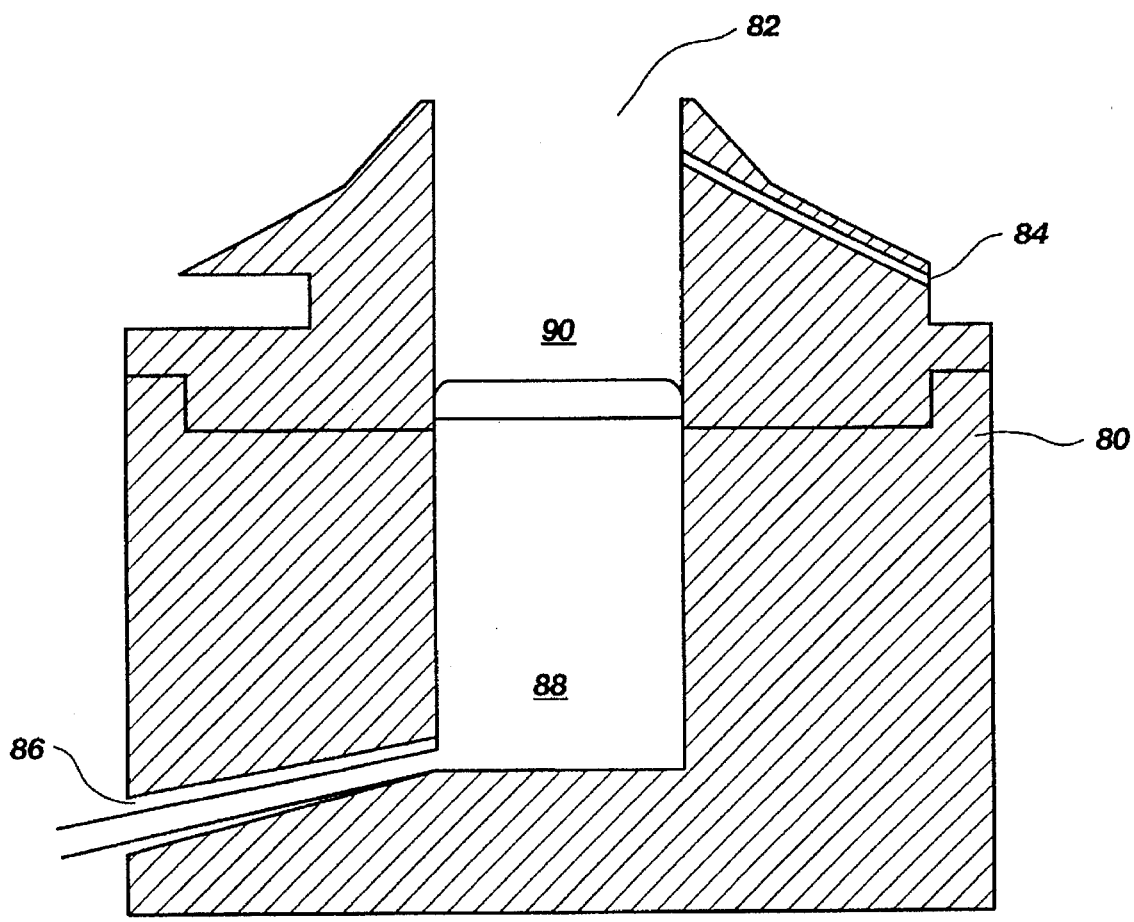
FIG. 1E shows a prior art artificial ear which is typically used to calibrate earphones used to test for hearing loss, and which may be used with the simulated human mastoid of the present invention to calibrate a bone conduction hearing device.

The disk 410 also includes an annular flange 416 which extends downwardly. When used with an artificial ear, such as those described regarding FIGS. 1E and 3, the flange 416 rests inside of the opening, so as to minimize lateral movement of the disk 410 and thereby enable the disk to be used without all of the support structures discussed with respect to FIG. 3.

Figure 7:
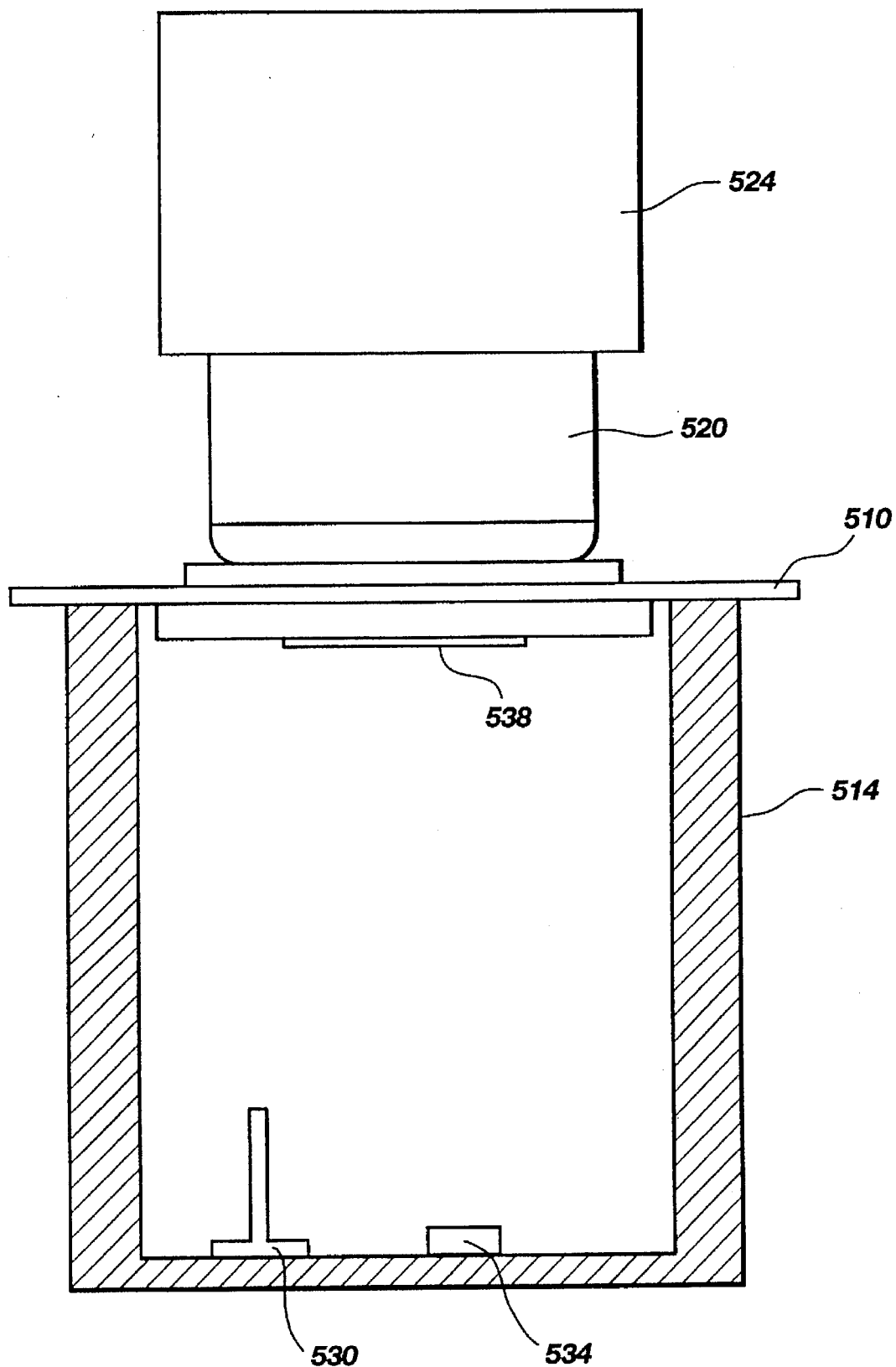
FIG. 7 shows an alternate method for practicing the present invention.

Referring now to FIG. 7, there is shown a side cross-sectional view of an alternate embodiment for practicing the present invention. Instead of resting upon a closed air column, as shown in FIG. 3, a diaphragm 510 rests upon a generally open base 514. A bone conduction transducer 520 rests atop the diaphragm 510, and is held against the diaphragm by a 5.4N weight 524. As with the embodiments previously discussed, in order to determine the effectiveness of the bone conduction transducer 520, the vibrational movement of the diaphragm 510 must be monitored. This is accomplished by providing a laser interferometer 530 which is positioned below the diaphragm 510, along with a position sensor 534. A reflective surface 538 is placed on the underside of the diaphragm 510, and the magnitude of the vibrations caused by the bone conduction transducer 520 is monitored by the sensor 534 as it measures the changing times between emission of the laser from the interferometer 530 and receipt by the sensor. Those skilled in the art will recognize that the readings from the sensor may then be used to determine the effectiveness of the bone conduction transducer 520 in overcoming the impedance of an average human mastoid, as represented by the diaphragm 510.

As will be appreciated by those skilled in the art, the present embodiment does not require an enclosed column of air as is provided by the artificial ear in FIG. 3. Rather, the base 514 need merely support the diaphragm 510 above the laser interferometer 530 and the sensor 534. The shape of the base 514 is relatively unimportant.

Thus there is disclosed an apparatus and method for simulating a human mastoid. The apparatus typically consists of a small diaphragm consisting of mass, springiness and damping means to replicate those aspects of a human mastoid (or other head bone) and the skin overlying the same. The diaphragm may be used effectively with a calibrated artificial ear, such as those which are commonly owned by audiologists. While support structures may be provided to retaining the diaphragm, the bone conduction transducer and a weight in their proper places, the diaphragm may be designed to obviate the need for such by nesting within the opening of the artificial ear, or some device serving a similar purpose. Those skilled in the art will recognize numerous modifications which may be made without departing from the scope of the present invention. The appended claims are intended to cover such modifications.

What is claimed is:

1. An apparatus for simulating a human mastoid comprising:

a diaphragm having a central section and a peripheral section which are configured in shape and composition to supply a desired reactance and resistance to a vibratory force such as is generated in a bone conduction transducer, based on mass and stiffness of the diaphragm, thereby simulating impedance of a human mastoid bone;

a housing having a void formed therein with an opening at one end so as to mechanically simulate a human ear, and a sensor means comprising an accelerometer disposed adjacent the void for detecting vibrational energy within the void, wherein the diaphragm is disposed across the opening of the void such that when a bone conduction transducer is applied to the diaphragm, vibration is transferred into the void and detected by the sensor means.

2. A method for testing a bone conduction transducer for correct vibratory response, comprising the steps of:

a) selecting a supporting base which includes open, support structure which does not interfere with free movement of a supported diaphragm for simulating a human mastoid;

b) selecting a diaphragm having a mass and resilience responsive to vibration and simulating a human mastoid;

c) positioning the diaphragm at the open, support structure;

d) vibrating a bone conduction transducer at a desired frequency range so as to generate vibration of the diaphragm; and e) monitoring the vibration of the diaphragm to determine the vibrational output of the bone conduction transducer.

3. The method according to claim 2, wherein step (a) comprises selecting an artificial ear.

4. The method according to claim 2, wherein the step (b) comprises selecting a diaphragm having a mass, springiness and damping means so as to provide an impedance similar to that of a human mastoid.

5. The method according to claim 2, wherein step (e) comprises, more specifically using a microphone to monitor sound generated by the vibration of the diaphragm to determine the vibrational output of the bone conduction transducer.

6. The method according to claim 2, wherein step (e) comprises, more specifically using an accelerometer to monitor force generated by the vibration of the diaphragm to determine the vibrational output of the bone conduction transducer.

7. The method according to claim 2, wherein step (e) comprises, more specifically using a laser interferometer and a position sensor to monitor changes in positioning of the diaphragm caused by the vibration of the diaphragm to determine the vibrational output of the bone conduction transducer.

8. The method according to claim 2, wherein the desired range is between about 125 Hz and about 8000 Hz.

* * * * *